UNITED STATES PATENT OFFICE.

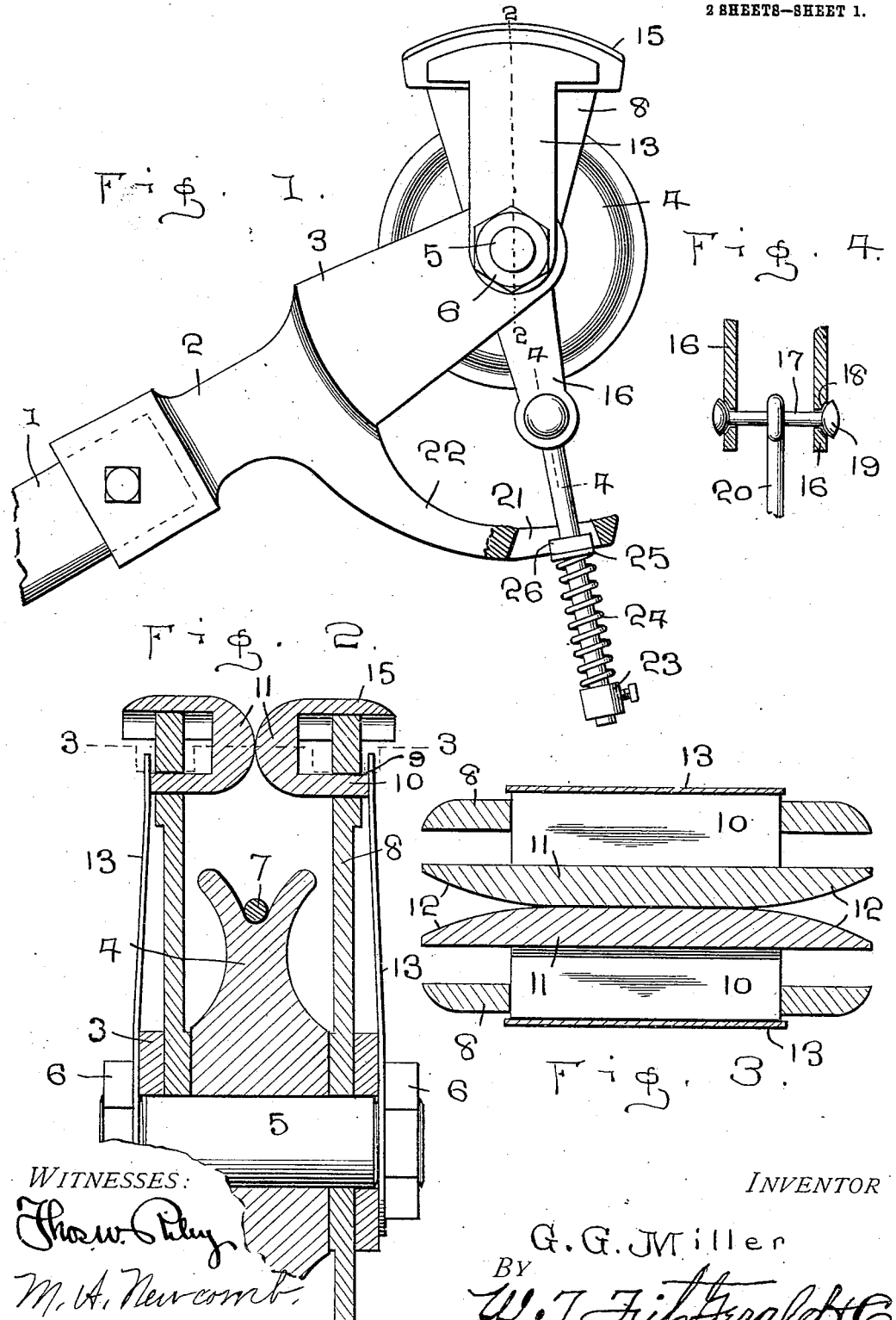
G. G. MILLER
TROLLEY.
APPLICATION FILED NOV. 3, 1908.
936,341.
Patented Oct. 12, 1909.
2 SHEETS—SHEET 1.
WITNESSES:
INVENTOR
G. G. Miller
BY
W. J. FitzGerald & Co.
Attorneys G. G. MILLER.
TROLLEY.
APPLICATION FILED NOV. 3, 1908.
936,341.
Patented Oct. 12, 1909.
2 SHEETS—SHEET 2.
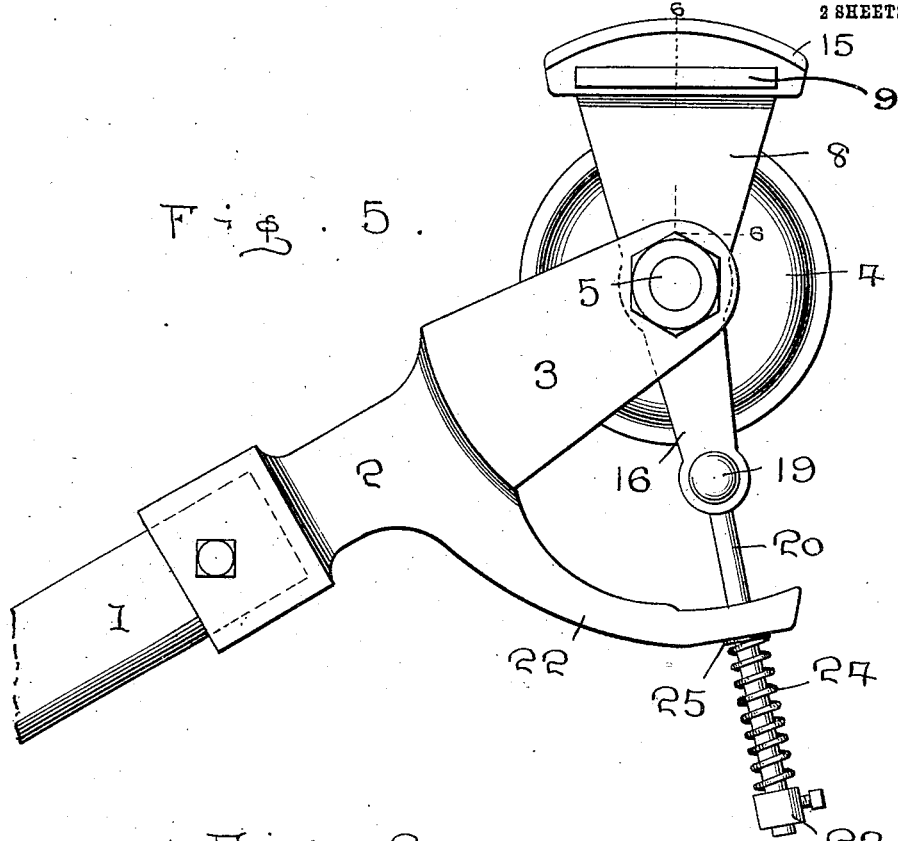
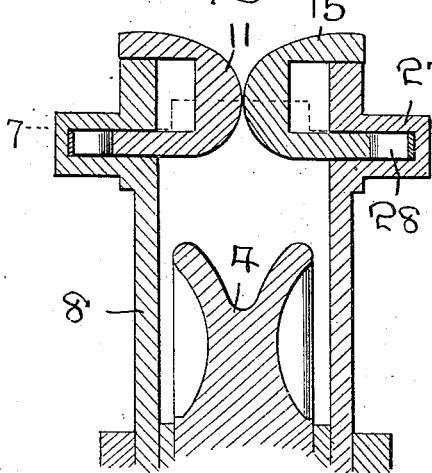
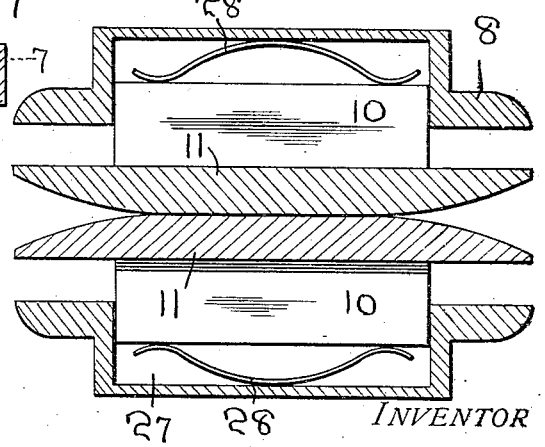
WITNESSES:
Thos. W. Riley
M. A. Newcomb
INVENTOR
G. G. Miller
BY
W. J. FitzGerald & Co.
Attorneys

GEORGE G. MILLER, OF BALTIMORE, MARYLAND.

TROLLEY.

936,341.   Specification of Letters Patent.   Patented Oct. 12, 1909.

Application filed November 3, 1908. Serial No. 460,901.

*To all whom it may concern:*

Be it known that I, GEORGE G. MILLER, a citizen of the United States, residing at Baltimore, in the State of Maryland, have invented certain new and useful Improvements in Trolleys; and I do hereby declare the following to be a full, clear, and exact description of the invention, such as will enable others skilled in the art to which it appertains to make and use the same.

My invention relates to new and useful improvements in trolleys, and more particularly to that class adapted to be used in connection with street or road railway cars and my object is to provide means for preventing the trolley wheel from accidentally leaving the trolley wire.

A further object is to provide yielding means for preventing breakage of the device, as when a hanger for the controlling wire is encountered.

A further object is to provide means for normally holding the parts in position to engage the trolley wire and a still further object is to provide a yielding connection for parts of the device, whereby the trolley will be permitted to readily pass through frogs, or the like, on the trolley wire.

Other objects and advantages will be hereinafter referred to and more particularly pointed out in the claims.

In the accompanying drawings which are made a part of this application, Figure 1 is a side elevation of my improved trolley construction complete. Fig. 2 is a detail sectional view on an enlarged scale as seen on line 2—2, Fig. 1. Fig. 3 is a sectional view as seen on line 3—3, Fig. 2. Fig. 4 is a detail sectional view as seen on line 4—4, Fig. 1. Fig. 5 is a side elevation of a slightly modified form of construction. Fig. 6 is a detail sectional view on an enlarged scale as seen on line 6—6, Fig. 5, and, Fig. 7 is a sectional view as seen on line 7—7, Fig. 6.

Referring to the drawings in which similar reference numerals designate corresponding parts throughout the several views, 1 indicates the trolley pole, which may be constructed in the usual or any preferred manner, to the upper end of which is secured a frame 2 having ears 3 at its outer end, between which is located the usual or any preferred form of trolley wheel 4.

A shaft 5 is extended laterally through the free ends of the ears 3, on which the trolley wheel is mounted, the ends of said shaft being threaded and provided with locking nuts 6 by which means the shaft is securely held in position.

In order to hold the trolley wheel in engagement with the trolley wire 7, a pair of plates 8 are rotatably mounted on the shaft 5 between the trolley wheel 4 and the ears 3, said plates being preferably substantially fan shaped and provided adjacent their upper ends with slots 9, through which extend the shanks 10 of keepers 11, the meeting faces of said keepers being preferably oval in cross section, whereby the trolley wire may be readily introduced between the keepers and in order to prevent the ends of the keepers from engaging the hangers employed for supporting the wires 7, said ends are curved outwardly as shown at 12 in Fig. 3 to form substantially V-shaped notches into which the hangers enter as the trolley is moved forwardly or rearwardly.

The meeting faces of the keepers 11 are normally held in engagement with each other by means of spring arms 13, the lower ends of said arms being mounted on the shaft 5 between the nuts 6 and ends of ears 3, said springs being so arranged as to have swinging movement co-incident to the swinging movement of the plates 8.

The upper ends of the spring arms 13 are inclined inwardly and engage the free ends of the shanks 10, thereby directing inward pressure on the shanks and forcing the meeting faces of the keepers 11 into engagement with each other, the tension of the springs being such as to normally prevent the trolley wire from passing therebetween, as when the trolley wheel leaves the wire, but in view of the curvature of the meeting faces of the keepers, the trolley may be readily released from the wire by giving a downward pull on the trolley pole and in view of the tension of the usual form of springs (not shown) for holding the trolley wheel in engagement with the trolley wire, the keepers 11 will be separated to permit the wire to pass into engagement with the trolley wheel when the trolley wire is properly positioned on the curved meeting faces of the keepers.

The shanks 10 are protected from sleet, ice and the like by extending over the upper ends of the plates 8 shields 15, which shields are preferably formed integral with the upper edges of the keepers 11 and are curved to conform to the curvature of the upper edges of the plates and extend from the keepers to a point beyond the outer ends of the shanks 10, thereby forming a covering for the shanks and the ends of the spring arms engaging the shanks.

The plates 8 are arranged to swing on the shaft and are normally held in position to extend the keepers over the trolley wire by providing each of the plates with a depending finger 16, the free ends of which extend beyond the edge of the trolley wheel and are connected together by means of a rod 17, the ends of the rod extending through openings 18 in the fingers 16, the outer ends of the openings having curved seats to receive the curved heads 19 on the ends of the rod 17, the openings 18 being greater in diameter than the rod, whereby said rod may have slight play, thus permitting the plates 8 to swing slightly independently of each other.

Depending from the rod 17 is a plunger 20, which plunger extends through a slot 21 in the free end of a curved arm 22 carried by the frame 2, the plunger 20 being of sufficient length to extend a distance beyond the arm 22 and has adjustably secured to its lower end a collar 23, while between the collar and arm is located a tension spring 24, the upper end of the spring engaging a washer 25, the upper face of which is provided with a projection 26 adapted to enter the slot 21 and hold the washer against rotation.

The object in providing the spring 24 is to compensate for the jar occasioned by the keepers 11 engaging the supporting hangers for the trolley wheel and it will be readily understood that when the car to which the trolley is secured, is traveling rapidly, the keepers will engage the hangers with considerable impact, but the jar coincident thereto will be compensated for by the spring 24, which will permit the plates 8 to swing slightly rearwardly until such time as the keepers 11 can separate and permit the hangers to pass between the same.

The rod 17 is also arranged to permit independent swinging movement between the plates 8, as when the car is passing around a curve, one of the keepers 11 is apt to strike the hanger sooner than the other keeper and in this event the plate carrying the keeper first engaging the hanger, will swing rearwardly, while the other keeper will maintain its normal position until both of the keepers engage the hanger, when the keepers will separate and permit the hanger to pass between the same. This feature is also applicable in case a frog or switch is encountered on the trolley wire.

In Figs. 5, 6 and 7 I have shown a slightly modified form of device, in that the spring arms 13 are dispensed with and a socket 27 formed on the outer face of the plates 8, into which are disposed the shanks 10 and in lieu of the spring arms 13, any suitable form of spring, preferably bow-shaped such as 28, is introduced into the socket ahead of the shanks 10, said springs serving to normally hold the meeting faces of the keepers in engagement with each other. It will further be seen that in this construction the shields 15 are made shorter than in the other construction, in view of the fact that the socket 27 forms a covering for the end of the shanks. It will thus be seen that I have provided a very cheap and efficient means for retaining the trolley wheel in engagement with the trolley wire and one that can be readily introduced over or removed from the trolley and although I have shown a trolley wheel having a deep channel to receive the trolley wire, it will be readily understood that the channel may be made of such size as to snugly receive the trolley wire as the keeper will prevent the trolley wheels from leaving the wire.

What I claim is:

1. In a trolley construction of the class described, the combination with a frame and a shaft carried by said frame; of a pair of plates carried by said shaft, a trolley wheel on said shaft between the plates, said plates having depending fingers, a rod loosely connecting said fingers, means engaging the rod to normally hold the plates in a vertical position and spring actuated means carried by the plates adapted to extend over the trolley wire and hold the trolley wheel in engagement therewith.

2. In a trolley construction of the class described, the combination with a frame having ears thereon, a shaft extending through said ears and a trolley wheel rotatably mounted on said shaft; of a pair of plates movably mounted on said shaft and at opposite sides of the trolley wheel, the upper ends of said plates having slots, a pair of keepers having shanks thereon adapted to extend through said slots, shields on said keepers and springs adapted to engage the ends of said shanks and normally hold the keepers in engagement with each other.

3. In a trolley construction of the class described, the combination with a frame having ears thereon, a curved arm extending from said frame and having a slot therethrough, a shaft extending through said ears and a trolley wheel on said shaft; of a pair of plates mounted on said shaft and at opposite sides of the trolley wheel, keepers carried by said plates, said keepers having shanks, springs adapted to normally hold the meeting faces of the keepers in engagement with each other, shields carried by the keepers adapted to extend over the upper ends of the plates and means on the plates adapted to engage said curved arm and normally hold the plates in a vertical position.

4. In a trolley construction of the class described, the combination with a frame having a slotted curved arm thereon, a trolley wheel carried by the frame, a pair of plates also carried by said frame, keepers on the plates and means to normally hold said keepers in engagement with each other; of a rod loosely connecting the lower ends of the plates, a plunger on said rod extending through the slot in the curved arm, a spring on the extended end of said plunger and means to retain the spring in position on the plunger and increase or decrease the tension thereof.

In testimony whereof I have signed my name to this specification in the presence of two subscribing witnesses.

GEORGE G. MILLER.

Witnesses:
 GEORGE SOMSETH,
 WILLIAM JONES.